United States Patent Office 2,976,840
Patented Mar. 28, 1961

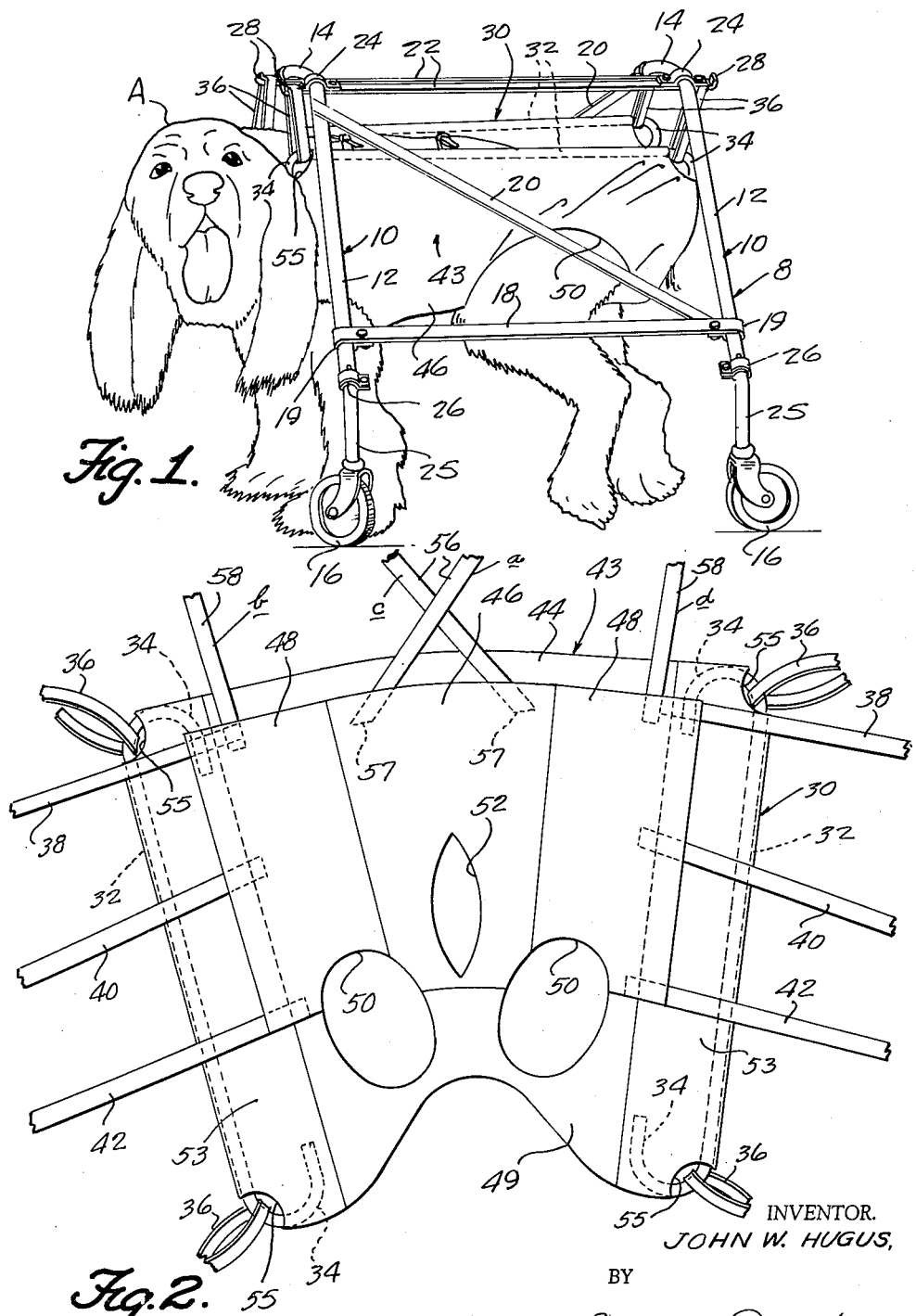

2,976,840
SUSPENSORY SLING FOR ANIMALS
John W. Hugus, 610 Humboldt, Richmond, Calif.
Filed Sept. 26, 1958, Ser. No. 763,651
5 Claims. (Cl. 119—1)

This invention relates generally to slings, traction apparatus, or equivalent support devices for animals that have been injured or have otherwise become incapacitated. More particularly, the invention has reference to a rollable carriage or sling of the suspensory type, so designed as to elevate the hind legs of an animal.

Many instances arise in which dogs, cats, or other pets, or for that matter larger domesticated animals such as horses, are incapacitated to the extent that they are unable, either temporarily or permanently, to use their hind legs. For example, a dog of great age may become paralyzed, or alternatively, the dog or other pet may break its leg, as a result of which the dog is unable to move about, except perhaps under conditions that cause the animal great pain.

In such circumstances, the animal may fail to respond to treatment, and quite frequently will die if unable to obtain sufficient exercise.

In view of the above, the main or broad object of the present invention is to provide a generally improved sling of the suspension type, so designed as to elevate the hind quarters of the dog or other pet, while supporting the same comfortably and with minimum possibility of pain so far as the animal is concerned.

Another object is to so form the sling that the animal will be able to move about and obtain sufficient exercise despite the fact that its hind legs are elevated.

Another object is to provide a sling as stated which will be particularly designed for swift adjustment of the same to fit the size of the particular animal.

A further object is to facilitate the application of the device to the animal, and to facilitate also, the removal of the sling from the animal.

A further object is to provide a device as stated which will be comfortable and will confine the animal to a comparatively small degree when in use.

Yet another object is to so form the device that the animal-contacting portions thereof will be readily removed from the adjacent frame components of the device, and will be adapted to be swiftly and easily washed so as to be maintained in a sanitary condition.

Other objects will appear from the following description, the claims appended thereto, and from the annexed drawing, in which like reference characters designate like parts throughout the several views, and wherein:

Figure 1 is a perspective view of a mobile, suspension-type sling according to the present invention, as it appears when in use; and Figure 2 is an enlarged plan view of the flexible support means, per se, in fully opened position.

Referring to the drawing in detail, the sling comprising the present invention includes a rollable frame generally designated 8, said frame including identical front and rear end frames generally designated 10 each of which is substantially in the shape of an inverted U so as to be disposed bridge-fashion over the animal A.

The end frames can be formed of tubular, non-corrosive stock, which could be of light material, such as aluminum. In any event, the end frames 10 are so formed that each includes downwardly divergent legs 12, said legs at their upper, convergent ends being integrally connected by a transversely extending, upwardly, shallowly arched bight portion 14.

The end frames are connected in spaced relation by a plurality of longitudinally extending connecting bars. Further, the end frames are mounted to roll upon the support surface, with the legs 12 of the front end frame having at their lower ends swiveled casters 16, while the legs 12 at the rear end of the device also have casters 16 at their lower ends, though the rear casters 16 are maintained against swiveling movement. Thus, the animal is permitted to effect turning of the device, with the front end of the device turning wherever the animal turns, and with the rear end of the same following in the path of the front end.

At each end of the device there are provided horizontally extending, lower longitudinal connecting bars 18, each of which has at its opposite ends end portions 19 that extend above and are fixedly clamped to the legs 12. Diagonally extending braces 20 are extended between the end frames, to provide suitable bracing means at opposite sides of the device.

Extending between the bight portions 14 are transversely spaced upper longitudinal brace or connecting members 22, these being connected to the end frames by means of clamps 24.

Legs 12, at their lower ends, receive extension legs 25, to the lower ends of which are connected the casters 16. The extension legs 25 have vertical lower end portions, and have inclined upper end portions that slidably telescope within the lower end portions of the several legs 12. Clamps 26, extending about the extension legs 25, are carried by the legs 12. On loosening of the clamps 26, the extension legs 25 can be telescopically adjusted within the legs 12, after which the clamps 26 are tightened once again. This provides for a height adjustment of the end frames, so as to permit the device to be fitted to dogs of different sizes.

Connecting bars 22 have longitudinal extensions 28 projecting beyond the respective end frames, and formed at their extremities with upwardly extending lips providing abutments or stops.

Generally designated at 30 is a flexible sling member, which is adapted to be suspended from the extensions 28, and which is adapted to be transversely flexed into a channel shape to receive the animal. The sling member 30 at its opposite sides (see Figure 2) includes framing bars 32 extending longitudinally of the respective sides of the sling member, each rod 32 being formed with inwardly turned, hook-shaped ends 34. The rods may be of tubular, light metal stock such as aluminum, and the hook-like ends 34 define loops receiving flexible suspension loop members 36, which are adapted to be suspended from the lipped longitudinal extensions 28.

Front, intermediate, and rear side straps 38, 40, 42 respectively are connected at their inner ends to the side portions of the body part of the sling member, and project laterally outwardly therefrom to be used in a manner to be described in greater detail hereinafter. The body part of the sling member has been generally designated at 43, and may be formed in any of various ways. In the illustrated example, the body part 43 includes a transverse front strip 44 connected to intermediate and side pieces 46, 48 respectively, which are secured at their rear ends to a rear piece 49. This provides a wide, flexible body part which would be of any suitable material, such as nylon or other readily washable, quick drying, strong material.

Formed in the rear portion of the body part 43 are leg openings 50, and between and immediately in front of the leg opeings 50 is a longitudinally extending, elliptically shaped opening 52 through which the excretory functions can be discharged.

Designated at 53 are longitudinally extending side panels, which are folded upon themselves to receive the rods 32, thus providing longitudinally extending side hems on the body part 43 receiving the rods 32. At their ends, the hems have openings 55 exposing portions of the hook members 34, so as to permit extension of the loop members 36 about the hook members 34.

Designated at 56 are intermediate front straps, which are fixedly secured at their inner ends 57 to the front of the body part 43. The straps 56 are in crossing relation, as shown in Figure 2, and at opposite sides of the cross strap 56 there are side front straps 58.

In use, the sling member shown per se in Figure 2 and generally designated 30 is fitted to the animal, with the animal's hind legs being put through the leg holes 50 and the front legs being disposed ahead of the front edge of the body part 43. The side straps 38, 40, 42 are extended over the animal's back with the strap 38 being connected to each other by a bow knot, and with straps 40 being similarly connected to each other, etc.

Then, one of the elongated intermediate front straps 56 is designated at *a*, is brought forward between the animal's front legs and up, crossing over to the right side of the animal's neck, and back across its shoulders, after which it is tied to that one of the front side straps 58 which has been designated at *b*. Then, the other elongated strap 56, as shown at *c*, is brought from the right center front edge of the body part 43, is brought forward between the front legs of the animal, up and across over to the left side of the animal's neck, up, back and across the shoulders, and then tied to the side strap 58 designated at *d*. The sling is now firmly attached to the animal. The frame is now positioned over the animal with the swiveled casters in front. The loop members 36 are now suspended from the extensions 28. The loop members 36 are preferably provided with buckles in a commercial embodiment, so that they can be adjusted in length. Each loop member 36 is thus adjusted to the desired length.

Should the animal be found not to have been elevated high enough when the straps or loop members 36 are fully shortened, the legs of the frame should be lengthened. This is done in the manner previously described herein. Thereafter, the animal is placed back in the frame and the straps or loop members 36 are readjusted to the correct length. In the event that it is necessary to wash the flexible sling member 30, this is readily accomplished by removing the sling from the frame. This may be done without removing the rods 32 or straps 36. For a thorough washing one may remove the straps or loop members 36 and then the suspension rods. This is done by turning one end of each suspension rod 90 degrees within its associated hem or sleeve, so that its hooked extremity is faced to the outside rather than to the inside as in Figure 2. In these circumstances, the hooked end may be readily slipped out through the adjacent corner hole 55. The suspension rods are put back in place by reversing this process. In other words, one inserts a rod in its hem with the hooked ends outward, after which the hooked ends are slipped into the sleeve and the rod is then turned 90 degrees within the sleeve to face the hooks inwardly of the device in the manner shown in Figure 2. The loop members 36 may then be inserted through the corner holes 55, under the hook-like ends 34 of the rods.

A suspension type sling formed as shown has many very desirable characteristics, in that it provides a comfortable, effective support for the animal, which keeps the animal's hind quarters elevated. Yet, the animal is permitted maximum freedom of movement, and can walk about or even run, with the frame rolling as necessary wherever the animal should desire to go.

The invention has the further desirable characteristic in that the animal can be swiftly removed from the frame, merely by slipping the loop members 36 off the extensions 28. It is important to note that when this is done, the animal-supporting sling member 30 is automatically freed completely from the frame. It is a simple matter to remove the sling member 30 from the animal itself by untying the several straps 38, 40, 42, 56 and 58.

Another very important characteristic of the invention resides in the fact that the animal is immobilized to a minimum extent, despite the fact that both hind legs are lifted. In other words, there is no splint-like action involved in the device at all. No portion of the animal is kept completely rigid, and the animal's body is confined to a minimum extent, permitting maximum movement of any portion of the animal's body. The arrangement, it may be noted, is such that in normal use of the device, the hind legs are not elevated completely out of contact with the ground surface. Rather, it is desirable, and is a characteristic of the invention, that the hind legs of the animal touch, very lightly, the ground surface. In this way the animal tends to reach out and try to resume normal leg movement.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A sling for animals comprising a rollable support frame including a pair of roller-equipped end frames formed to an inverted U-shape so as to extend over an animal, said frame further including means connecting the end frames in spaced relation; and a flexible sling assembly suspended from said frame and adapted to support an animal with selected legs of the animal in an elevated position, said flexible sling assembly including a flexible body part having leg openings, and strap means for connecting the body part about the animal, said sling assembly further including suspension loops adapted for being detachably connected to the support frame adjacent the respective end frames, the support frame including a pair of longitudinally extending, transversely spaced upper connecting rods extending between the upper portions of the end frames and formed with longitudinal, lipped extensions projecting beyond the respective end frames, said loops being engageable over the extensions for effecting the suspension of the sling assembly from the support frame.

2. A suspensory sling for animals comprising: a wheeled support frame proportioned for disposition in straddling relation to an animal to be supported, said frame including forwardly and rearwardly projecting, lipped extensions at its front and rear ends respectively; sling suspension loops depending from and removably engaged with said extensions; and a transversely flexible sling assembly extending within the frame and adapted for supporting said animal with its legs in an elevated position, said assembly having front and rear ends disposed below and respectively suspended by the loops from said front and rear extensions of the support frame.

3. A suspensory sling for animals comprising: a rollable support frame proportioned for disposition in straddling relation to an animal to be supported, said frame including a pair of transversely spaced front legs and a pair of transversely spaced rear legs, all of said legs being wheeled to produce the rolling movement of the frame, said frame further including forwardly and rearwardly projecting extensions at its front and rear ends respectively, each of said extensions having a distal end terminating in an upturned lip; sling suspension loops depending from and removably engaged with said extensions, said lips being disposed as abutments limiting the loops against movement off the frame; and a transversely flexible sling assembly extending within the frame and adapted for supporting said animal with its legs in an elevated position, said assembly having front and rear ends disposed below and respectively suspended by the loops from said front and rear extensions of the support frame.

4. A suspensory sling for animals comprising: rollable support means including front and rear end frames respectively formed in an inverted U-shape so as to be locatable in straddling relation to an animal to be supported, each end frame including a bight portion extending transversely of the frame and a pair of wheeled legs depending from and rigid with the bight portion, said means further including at least one connecting rod extending longitudinally thereof and secured to and extending between the end frames to fixedly connect the same in spaced relation, said rod including forwardly and rearwardly projecting extensions at its front and rear ends respectively, said extensions respectively projecting beyond the front and rear end frames and being formed with distal ends terminating in upturned lips, said lips and the adjacent portions of the respective end frames constituting abutments spaced longitudinally of each extension; sling suspension loops depending from and removably engaged with the respective extensions, between the spaced abutments of the extensions so as to be limited by the abutments against movement off the support means; and a transversely flexible sling assembly extending within the frame and adapted for supporting said animal with its legs in an elevated position, said assembly having front and rear ends disposed below and respectively suspended by the loops from the front and rear extensions of said connecting rod.

5. A suspensory sling for animals comprising: rollable support means including front and rear end frames respectively formed in an inverted U-shape so as to be locatable in straddling relation to an animal to be supported, each end frame including a front portion extending transversely of the frame and a pair of wheeled legs depending from and rigid with the bight portion, said support means further including a pair of connecting rods spaced transversely of the end frames and extending therebetween with their end portions secured to the bight portions of the respective end frames, said rods including forwardly and rearwardly projecting extensions at their front and rear ends respectively, said extensions respectively projecting beyond the front and rear end frames and being formed with distal ends terminating in upturned lips, said lips and the adjacent bight portions constituting abutments spaced longitudinally of each extension; sling suspension loops depending from and removably engaged with the several extensions between the spaced abutments of the extensions, so as to be limited by the abutments against movement off the support means; and a transversely flexible sling assembly extending within the frame and adapted for supporting said animal with its legs in an elevated position, said assembly having front and rear ends disposed below and respectively suspended by the loops from the front and rear extensions of the connecting rods.

References Cited in the file of this patent

UNITED STATES PATENTS

| | | |
|---|---|---|
| 453,727 | Sample | June 9, 1891 |
| 2,546,726 | Creamer | Mar. 27, 1951 |

OTHER REFERENCES

Washington Star; May 28, 1936, page A-3.